United States Patent [19]

Shizuka et al.

[11] Patent Number: 4,618,793
[45] Date of Patent: Oct. 21, 1986

[54] ROTOR FOR ALTERNATORS WITH MOLDED SLIPRING ASSEMBLY

[75] Inventors: Masayuki Shizuka; Shigeki Yamada, both of Katsuta, Japan

[73] Assignee: Hitachi, Ltd., Tokyo, Japan

[21] Appl. No.: 714,473

[22] Filed: Mar. 21, 1985

[30] Foreign Application Priority Data

Mar. 23, 1984 [JP] Japan .................................. 59-54491

[51] Int. Cl.$^4$ ...................... H02K 13/02; H01R 39/08
[52] U.S. Cl. ..................................... 310/232; 310/43; 339/8 R
[58] Field of Search .................... 310/42, 71, 232, 233, 310/234, 235, 236; 339/5, 6, 8

[56] References Cited

U.S. PATENT DOCUMENTS

| 2,708,246 | 5/1955 | Dunn ..................................... 310/235 |
| 3,253,167 | 8/1961 | Bates et al. ............................. 310/68 |
| 3,785,049 | 1/1974 | Kanamaru et al. ................... 339/8 R |
| 3,842,301 | 10/1974 | Smith ..................................... 310/232 |
| 4,209,213 | 6/1980 | Wussow .............................. 310/232 |

FOREIGN PATENT DOCUMENTS

| 48311 | 11/1983 | European Pat. Off. ............ 310/232 |
| 746259 | 5/1944 | Fed. Rep. of Germany ...... 310/232 |
| 2402852 | 7/1974 | Fed. Rep. of Germany ...... 310/232 |
| 3125555 | 3/1983 | Fed. Rep. of Germany ...... 310/232 |

Primary Examiner—Patrick R. Salce
Assistant Examiner—D. L. Rebsch
Attorney, Agent, or Firm—Antonelli, Terry & Wands

[57] ABSTRACT

An alternator rotor has a rotor shaft formed integrally on the center of a rotary magnetic pole assembly having a field coil wound thereon. The rotor shaft has an axial hole formed in one end surface thereof such as to extend axially inwardly and to receive a slip ring supporting shaft. The alternator rotor further has a slip ring assembly, including a couple of slip rings, conductor wires leading from the slip rings, respectively, and the slip ring supporting shaft, which are formed in one body by molding with an insulating material. The slip ring assembly is fixed to the rotor shaft, with the slip ring supporting shaft press-fitted in the axial hole of the rotor shaft.

6 Claims, 5 Drawing Figures

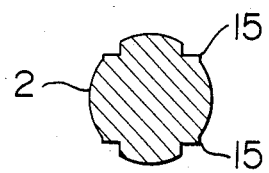
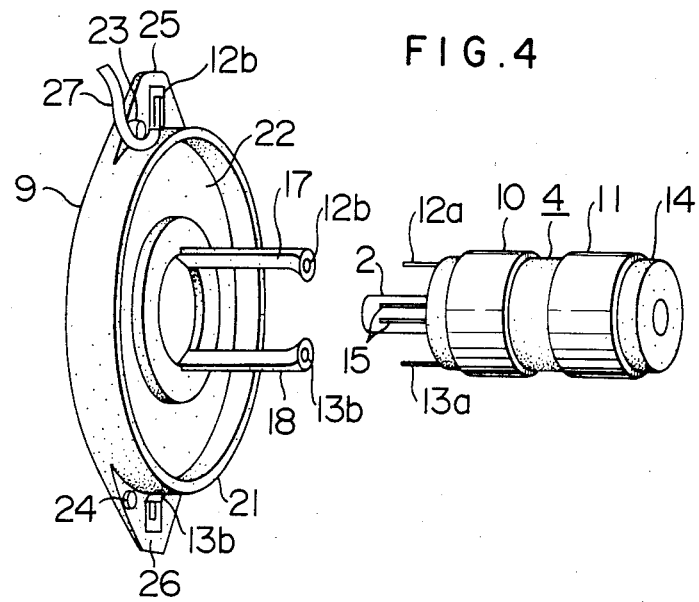
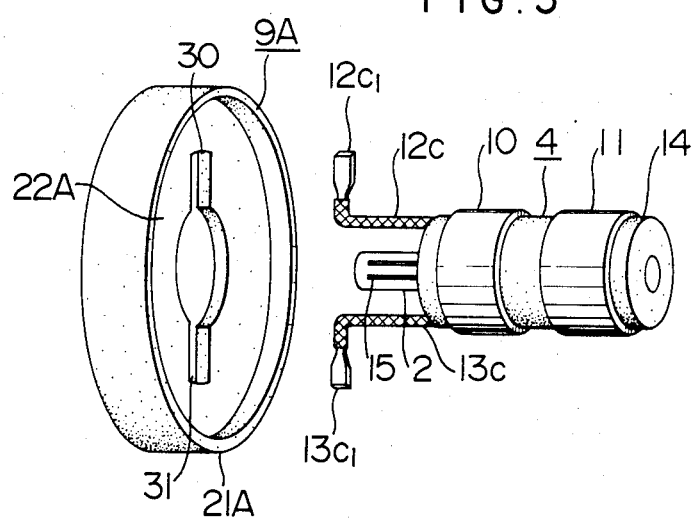

ROTOR FOR ALTERNATORS WITH MOLDED SLIPRING ASSEMBLY

BACKGROUND OF THE INVENTION

The present invention relates to a rotor for alternators and, more particularly, to an alternator rotor suited for use in alternators mounted on vehicles.

A typical alternator rotor designed for use on vehicles has, as disclosed in the specification of the U.S. Pat. No. 3,253,167, a rotary magnetic pole assembly composed of a pair of claw-type magnetic pole segments, field coils disposed in the magnetic pole assembly, a rotor shaft extending through the center of the rotary magnetic pole assembly and supported by bearings, a pair of slip rings arranged on one end of the rotor shaft with an insulator interposed between the slip rings, and cooling fans attached to both axial end surfaces of the rotary magnetic pole assembly. Thus, the known alternator rotors have common features that the cooling fans are attached to both end surfaces of the rotary magnetic pole assembly and the slip rings for supplying the field coils with electric current are fixed to one end of the rotor shaft. This arrangement affords a high cooling efficiency and a high output power by virtue of the cooling fans incorporated in the rotor. However, since the slip rings are usually fabricated separately from the rotor shaft and then forced onto the rotor shaft, the force by which the slip rings are fixed is inevitably small and the diameter is liable to be increased disadvantageously.

In some cases, the rotor shaft and the slip rings are united by molding with an insulating material. This, however, suffers from the following disadvantages due to the fact that the parts have to be properly placed in the mold.

(1) The size of the mold is increased.
(2) A long time is required for pre-heating the rotor shaft.
(3) The portions of the rotor shaft which are to be born by bearings have to be mechanically finished after the molding.

It is to be pointed out also that, since the portion for supporting the slip rings is constituted by a reduced-diameter portion of the rotor shaft, such portion tends to be deformed by cutting resistance during the final machining of the outer face of the rotary magnetic pole assembly.

SUMMARY OF THE INVENTION

Accordingly, it is an object of the invention to provide an alternator rotor which is improved to permit easy shaping of the slip ring supporting portion of the rotor shaft and easy machining of the outer face of the rotary magnetic pole assembly, thereby overcoming the above-described problems of the prior art.

Another object of the invention is to provide an alternator rotor having a superior dust-proof structure for the bearing adjacent the slip rings.

To these ends, according to one aspect of the invention, there is provided an alternator rotor comprising: a rotor shaft provided with an axial hole formed in the central portion of the axial end surface on the slip ring supporting side of the rotor shaft to extend axially inwardly therefrom, the axial hole being adapted to receive a slip ring supporting shaft; and a slip ring assembly formed integrally by molding such as to include the slip ring supporting shaft, a couple of slip rings and conductor wires leading from the slip rings, the slip ring assembly being fixed to the rotor shaft with the slip ring supporting shaft received in the axial hole in the rotor shaft, while connecting the slip rings to a field coil through the conductor wires.

This arrangement facilitates the formation of slip rings on the rotor shaft, as well as the machining of the outer face of the rotary magnetic pole assembly.

BRIEF DESCRIPTION OF THE DRAWINGS

FIG. 3 is an enlarged sectional view of a slip ring supporting shaft of the embodiment;

FIG. 4 is a perspective view of a second embodiment, showing particularly a slip ring assembly and a cover ring thereof; and FIG. 5 is an exploded perspective view of a slip ring assembly and a cover ring incorporated in a third embodiment of the invention.

DESCRIPTION OF THE PREFERRED EMBODIMENTS

Preferred embodiments of the invention will be described hereinunder with reference to the accompanying drawings.

Figure 1:
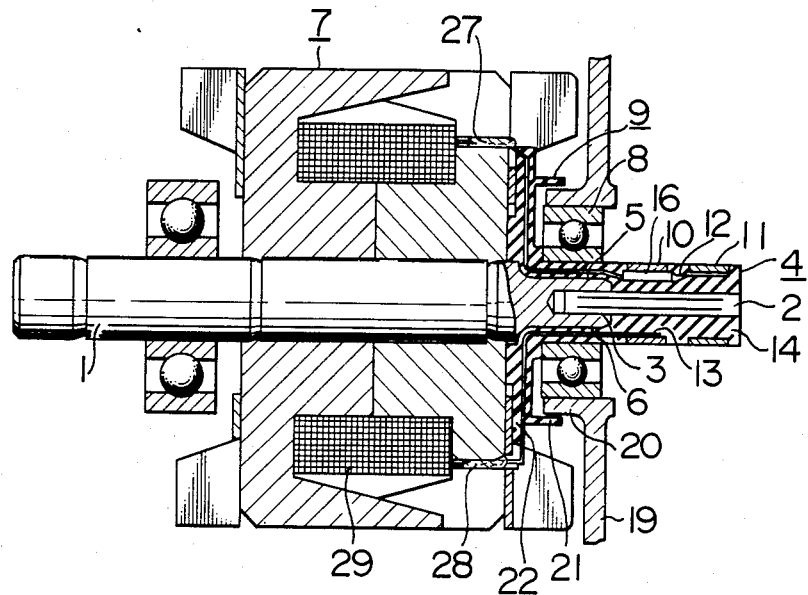
FIG. 1 is a vertical sectional view of a first embodiment of an alternator rotor in accordance with the invention.
Figure 2:
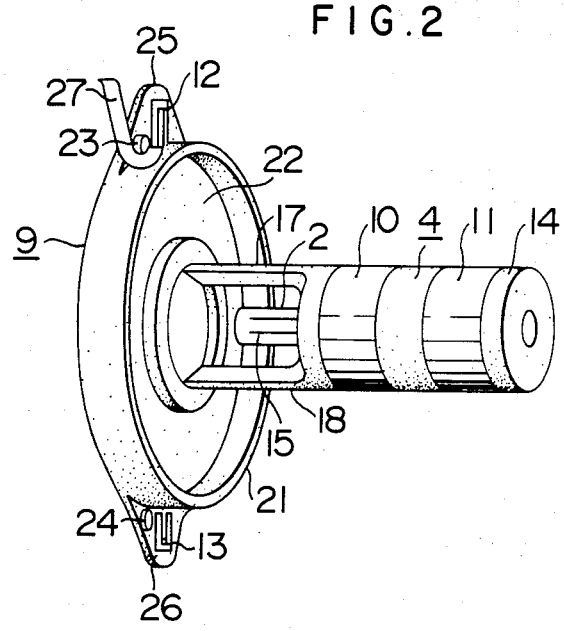
FIG. 2 is a perspective view of a slip ring assembly and a cover ring of the embodiment.

A first embodiment of the invention is shown in FIGS. 1 to 3. Referring first to FIG. 1, the end of a rotor shaft 1 adjacent slip rings 10, 11 projects only to an extent substantially beyond the outer surface of a bearing 8.

The above-mentioned end of the rotor shaft 1 has an axial hole 3 which is formed in the central portion thereof, extends axially inwardly therefrom, or leftward as viewed in FIG. 1, and is adapted for receiving a slip ring supporting shaft 2. A pair of grooves 5, 6 for receiving bridging legs of a slip ring assembly 4 are formed in the outer peripheral surface of the same end of the rotor shaft as the axial hole 3 at a circumferential interval of 180 degrees.

The hole 3 receives the supporting shaft 2 of the slip ring assembly 4. A cover ring 9 is provided between the end surface of a rotary magnetic pole assembly 7 adjacent the slip ring assembly 4 and the adjacent end of the bearing 8.

As will be seen from FIGS. 1 and 2, the slip ring assembly 4 and the cover ring 9 are formed integrally with each other.

The slip ring assembly 4 includes the slip ring supporting shaft 2 adapted to be received in the axial hole 3, slip rings 10,11, and conductor wires 12, 13. These components are united in one body by molding with an insulator 14 made of a synthetic resin. As shown in FIG. 3, a plurality of ridges 15 are formed in the outer periphery of the slip ring supporting shaft 2. The slip rings 10 and 11 are fixed to a half part of the slip ring supporting shaft 2 with a portion of the insulator 14 placed therebetween. The conductor wires 12 and 13 are connected at their one ends to respective slip rings 10,11 and are extended into the cover ring 9. The conductor wire 12 leading from the slip ring 11 is covered by an insulating tube 16 so as not to be contacted by the slip ring 10. The slip ring assembly 4 is fixed to the rotor shaft 1 in a joint manner such that the projecting portion of the slip ring supporting shaft 2 beyond the insulator 14 is pressfitted in the axial hole 3 formed in the end of the rotor shaft 1.

As shown in FIGS. 1 and 2, the cover ring 9 has an integral construction having the conductor wires 12,13, the bridging legs 17,18 to be received in the grooves 5,6, a cylindrical hub 21 surrounding a bearing receiving box 20 in the center portion of an alternator housing 19 while leaving a small annular gap, a disc portion 22, and tongues 25,26 provided with axial projections 23,24. These constituents are molded in one body with the insulator 14. The bridging legs 17,18 are connected at their one ends to the slip ring assembly 4 and at their other ends to the disc portion 22. The conductor wires are extended through the bridging legs 17,18 and the disc 22 and are led to the outside at the tongues 25,26, respectively. The cover ring 9 is secured to the rotor shaft 1 by means of its bridging legs 17,18 received in the grooves 5,6 of the end of the rotor shaft 1 with the hub 21 surrounding the bearing receiving box 20 of the alternator housing 19.

As will be seen from FIGS. 1 and 2, the slip rings 10,11 are connected to a field coil 29 through the conductor wires 12,13 and lead wires 27 and 28. Namely, the conductor wires 12,13 leading from the slip rings are extended through the slip ring assembly 4, the bridging legs 17,18, and the inside or outside of the disc portion 22, and are connected to the lead wires 27,28, respectively. The lead wires 27,28 are clamped between the projections 23,24 on the tongues 25,26 and the outer peripheral surface of the hub 21, and are then led to the field coil 29.

The alternator rotor of this embodiment is assembled in the following manner.

First of all, the rotor shaft 1 is forcibly driven into a bore formed in the rotary magnetic pole assembly 7 to be fixed thereto. Then, after performing an insulating treatment on the field coil 29, the outer peripheral surface of the rotary magnetic pole assembly 7 is machined, by making use of the axial hole 3 in the rotor shaft 1 as a reference.

In the alternator rotor of the described embodiment, the rotor shaft has no portion of a reduced diameter into which the slip ring assembly is press-fitted as in the case of a rotor shaft according to the prior art. Therefore, the machining of the outer peripheral surface of the assembly 7 can be made with a high precision and efficiency without any deformation of the rotor shaft 1 due to the cutting resistance.

Subsequently, the slip ring assembly 4 is fixedly mounted on one end of the rotor shaft 1. This is made by press-fitting the projecting end of the slip ring supporting shaft 2 into the axial hole 3 formed in the rotor shaft 1.

In the illustrated embodiment, the end of the slip ring supporting shaft 2 which is to be press-fitted into the axial hole 3 has a plurality of the ridges 15. Accordingly, the peripheral wall of the axial hole 3 is locally deformed plastically at portions thereof around the ridges 15, while providing a strong bonding between the rotor shaft 1 and the slip ring assembly 4. According to this construction, it is possible to securely unite the slip ring assembly 4 and the rotor shaft 1 with a high precision.

Then, the slip ring assembly 4 is further driven such that the bridging legs 17,18 of the cover ring 9 are securely received in the grooves 5,6 formed in the end portion of the rotor shaft 1. Then, the bearing 8 is fitted onto the end of the rotor shaft 1, and the alternator housing 19 is attached such that the bearing receiving box 20 fits around the bearing 8. Meanwhile, another bearing (not shown) is fitted on the other end of the rotor shaft 1 and an alternator housing is mounted such that its bearing box (not shown) fits around this bearing. In this state, the hub 21 of the cover ring 9 surrounds the bearing box 20, thus preventing effectively dust and foreign matter from coming into the bearing 8.

Then, the lead wires 27,28 are soldered to the conductor wires 12,13 so as to electrically connect the slip rings 10,11 to the field coil 29, thus completing the assembly.

FIG. 4 shows a second embodiment of the invention. In this embodiment, the slip ring 4 and the cover ring 9 are separated from each other at the ends of the bridging legs 17,18. Conductor wires 12a, 13a provided integrally in the slip ring assembly by molding are adapted to be pressed against the ends of connector terminals 12b, 13b provided integrally in the cover ring 9 by molding to be electrically connected thereto, when the end surface of the slip ring assembly 4 is brought into contac with the ends of the bridging legs 17,18.

The other construction of this embodiment is substantially the same as that of the first embodiment. Thus, this embodiment offers advantages substantially the same as those of the first embodiment and, in addition, facilitates the formation of the slip ring assembly 4 and the cover ring 9.

FIG. 5 shows a third embodiment of the invention which employs a cover ring different in shape from the cover ring used in the first and the second embodiments.

More specifically, a cover ring 9A of this embodiment has a hub 21A which surrounds the outer peripheral surface of a bearing receiving box, and a disc portion 22A which is formed with a bore for receiving a rotor shaft. The disc portion has a couple of notches 30 and 31 formed in the brim of the bore at a 180° interval.

In this embodiment, conductor wires 12c and 13c axially protruding from the slip ring assembly 4 are covered by insulating tubes and are bent radially outwardly at their ends $12C_1$, $13C_1$ in the form of a letter L. The ends $12C_1$ and $13C_1$ are flattened such as to be received in the notches 30, 31 formed in the cover ring 9A, where they are connected to lead wires.

This embodiment offers substantially the same advantages as those offered by the first embodiment and, in addition, further facilitates the formation of the slip ring assembly 4 and the cover ring 9A.

As has been described, according to the first aspect of the invention, there is provided an alternator rotor having a rotor shaft formed in the center portion of its end for mounting slip rings with an axial hole which extends axially inwardly from an end surface thereof and is adapted for receiving a slip ring supporting shaft, a slip ring assembly including the slip ring supporting shaft, the two slip rings and two conductor wires which are integrated by molding with an insulating material, the slip ring assembly being fixed to the rotor shaft with the slip ring supporting shaft fitted in the axial hole of the rotor shaft, and a field coil connected to the slip rings through the conductor wires. This arrangement remarkably facilitates the formation of the slip rings and the associated parts as compared with the case where the rotor shaft and the slip rings are molded integrally. This in turn allows a reduction in the size of the mold and a shortening of the molding time, while eliminating the necessity for the finishing machining on the portion of the rotor shaft which is to be born by the bearing adjacent the slip rings.

In addition, according to the first aspect of the invention, the rotor shaft need not have any end portion of a reduced diameter for carrying the slip rings, so that the undesirable deformation of the rotor shaft during the machining of the outer peripheral surface of the rotary magnetic pole assembly is avoided and the efficiency of the machining is improved advantageously.

According to the second aspect of the invention, the alternator rotor of the first aspect further has a cover ring disposed between an end surface of the rotary magnetic pole assembly adjacent the slip rings and the associated bearing, the cover ring including a hub portion surrounding the outer peripheral surface of a bearing receiving box for holding the bearing, a disc portion and conductor wires which are formed integrally by molding, the cover ring being mounted such that the hub portion surrounds the outer peripheral surface of the bearing box and such that the field coil is connected to two slip rings through the conductor wires in the slip ring assembly and the conductor wires in the cover ring. In this arrangement, the cover ring effectively prevents dust from coming into the bearing adjacent the slip rings.

What is claimed is:

1. A rotor for alternators comprising: a rotor shaft integral on the center of a rotary magnetic pole assembly having a field coil wound thereon; an axial hole in a central portion of one end surface of said rotor shaft and extending inwardly of the rotor shaft therefrom and receiving a slip ring supporting shaft; and a slip ring assembly including a plurality of slip rings, conductor wires leading from said slip rings, respectively, and said slip ring supporting shaft, said slip rings, said conductor wires and said slip ring supporting shaft being molded in one body with an insulating material, said slip ring assembly being fixed to said rotor shaft with said slip ring supporting shaft press-fitted in said axial hole of said rotor shaft.

2. A rotor according to claim 1, wherein said slip ring supporting shaft is provided on an outer peripheral surface thereof with a plurality of ridges, and said slip ring supporting shaft is firmly received in said axial hole by means of a bonding force exerted from an inner wall of said axial hole around said ridges due to plastic deformation thereof.

3. A rotor for alternators comprising: a rotor shaft integral on the center of a rotary magnetic pole assembly having a field coil wound thereon; an axial hole in a central portion of one end surface of said rotor shaft to extend inwardly of the rotor shaft therefrom and receiving a slip ring supporting shaft; a slip ring assembly including a plurality of slip rings, conductor wires leading from said slip rings, respectively, and said slip ring supporting shaft, said slip rings, said conductor wires and said slip ring supporting shaft being molded in one body with an insulating material; and an integrally molded cover ring including a disc portion facing an end surface of said rotary magnetic pole assembly on the slip ring side thereof, a hub united with said disc portion and surrounding a bearing receiving box of an end bracket leaving a gap therebetween, and conductor wires, said slip ring assembly fixed to said rotor shaft with said slip ring supporting shaft press-fitted in said axial hole of said rotor shaft, and said cover ring covers said bearing and said bearing receiving box.

4. A rotor according to claim 3, wherein either one of said slip ring assembly and said cover ring is provided with bridging legs extending in parallel with said rotor shaft, and said conductor wires being fixed to said bridging legs by molding.

5. A rotor according to claim 3, wherein said slip ring supporting shaft is provided on an outer peripheral surface thereof with ridges, and is press-fitted into said axial hole of said rotor shaft.

6. A rotor according to claim 3, wherein bridging legs are integral with said cover ring, and said conductor wires of said cover ring are embedded in said bridging legs and contact said conductor wires of said slip ring assembly fixed to said rotor shaft.

* * * * *